Jan. 20, 1931.  C. KONCITIK  1,789,632
BRAKE OPERATING MEANS
Filed April 25, 1930
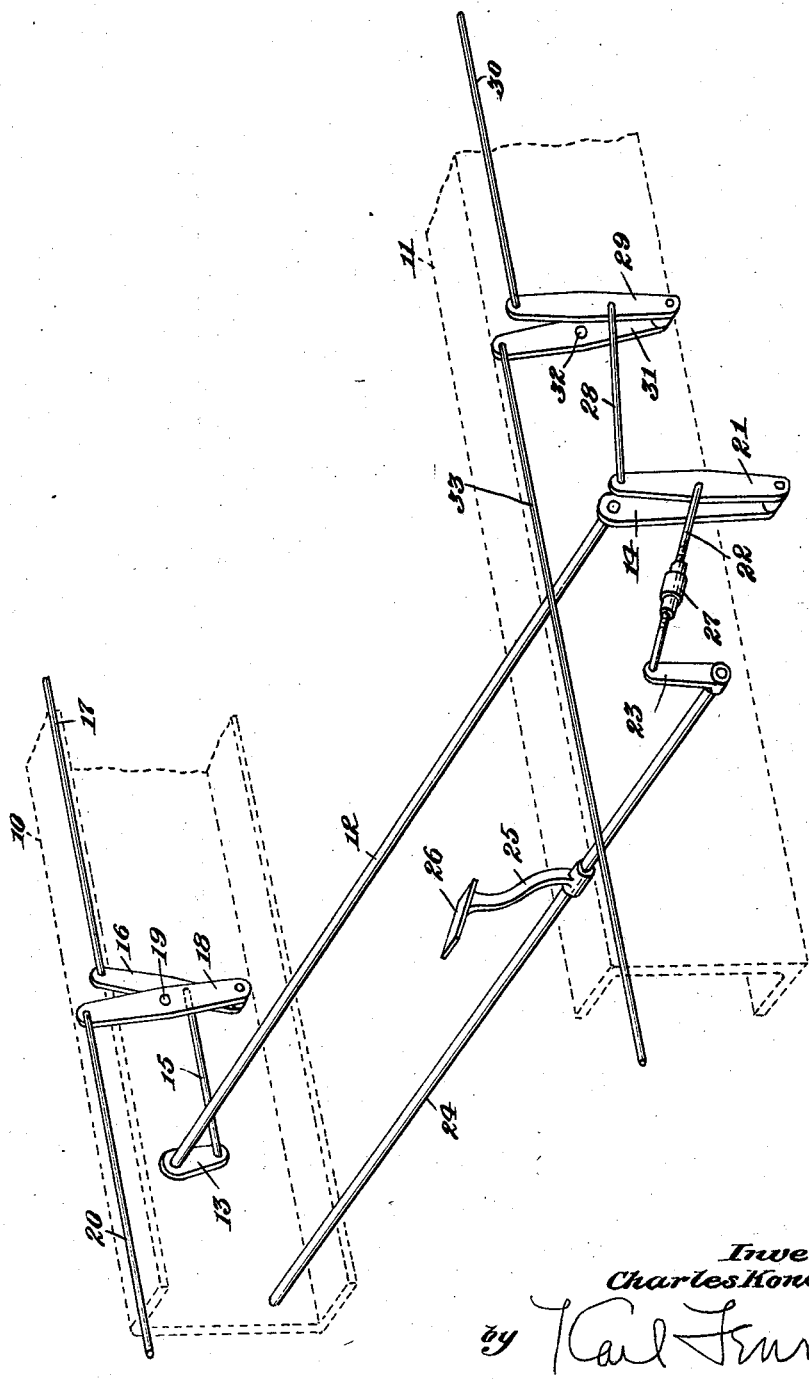
Inventor:
Charles Koncitik,
by Carl Finning
his Att'y.

Patented Jan. 20, 1931

1,789,632

UNITED STATES PATENT OFFICE

CHARLES KONCITIK, OF DETROIT, MICHIGAN, ASSIGNOR OF FIFTY PER CENT TO SOL H. KAHN, OF DETROIT, MICHIGAN

BRAKE-OPERATING MEANS

Application filed April 25, 1930. Serial No. 447,234.

The present invention relates to means for operating brakes of vehicles and is particularly directed toward a structure economical to make and install, and certain and sure of operation in a satisfactory manner. The particular type of brake to which the invention is specifically directed is that means for slowing or stopping the movement of a vehicle generally referred to as four-wheel brakes. In such an arrangement, brakes are applied to each of the four wheels of the vehicle and generally there is a separate braking mechanism for each wheel. In order to produce safe and sure braking, it is essential that the braking force applied to the various wheels shall be uniform in order to effect substantially the same stopping at each portion of the vehicle. To this end various equalizing mechanisms have been adapted and applied to braking systems.

The present invention is directed specifically to an equalizing mechanism which will allow a braking force to be applied at one point on the vehicle and equally distributed at the brakes upon each of the four wheels.

In order to produce the desired effect it is desirable that there be no rigid connection between the mechanism on which the power for operating the brakes is applied and the mechanism which actually applies the brakes. It is desirable that when the main operating mechanism on which the power is applied is moved it shall move the operating mechanism for each of the four brakes, but there should be interposed means for equalizing or relieving the various movements. To this end the present invention contemplates some such device as a rod which may be moved in any appropriate way to cause movement of a device which controls the movement of the brakes themselves. The connection, however, between such rod or other operating device and the main operating device is not rigid but such as to allow a restricted or limited freedom of movement between the two mechanisms. Likewise the devices for operating the specific individual brakes, while operated and controlled by the main operating mechanism, are loosely connected thereto so that they may equalize and adjust themselves.

Preferably the structure is such that in order to take up and adjust the brake operating mechanism only a single adjustment or change need be made and that adjustment may be made between the main operating mechanism and the mechanism for operating the brakes.

The particular mechanism employed to carry out the invention is immaterial but in the accompanying drawings is illustrated a diagrammatic perspective view of a specific form of brake operating mechanism embodying the invention, the frame of a vehicle being shown in dotted lines.

As far as the present invention is concerned it is immaterial what form of brake is employed and for that reason no brake mechanism has been illustrated. It will be understood, however, that the mechanism embodying the present invention is adapted and intended in operation and use to be associated with suitable braking mechanism, there being provided preferably a separate brake mechanism for each of the four wheels of the vehicle.

The braking mechanism of the present invention may be applied to any of a variety of vehicles including automobiles, motor trucks, railway cars, street cars or trams, carriages, wagons, horse-drawn vehicles and the like. Since the invention is of general application it has not been shown in connection with any specific form of mechanism or vehicle although it may be convenient in the description to refer to it as applied to a four wheel vehicle two of the side frame members of which are shown in dotted lines and marked 10 and 11 respectively in the drawing. Rotatably supported in the frame members is a transverse shaft 12 at one end of which is a downwardly projecting arm 13 and at the other end is a corresponding projecting arm 14. The arms 13 and 14 may be made integral with the shaft 12 but it may be found convenient to have them separate therefrom but secured to the shaft 12 so as to rotate therewith being fastened thereto by any suitable means. Preferably the arms 13 and 14 will extend in approximately the same angular direction from the shaft 12 although this specific arrangement is not essential to the operation. The arms 13 and 14 have been illustrated as extending downwardly from the shaft 12 but this arrangement is not essential. They might extend upwardly or at any other suitable angle. From the free end of the arm 13 a rod 15 is shown extending rearwardly and engaging a floating lever 16 from the upper end of which extends rearwardly a rod 17 which may be adapted to operate the brake for the rear right wheel of the vehicle. At its lower end the floating lever 16 is pivoted to and supported by a lever 18 which is carried at about its center by a pivot pin 19 supported by the frame member 10. Connected to the upper end of the lever arm 18 is a rod 20 which is shown extending forwardly and which may be adapted to operate the brake for the front right wheel of the vehicle.

Pivoted to the free end of the arm 14 is a floating lever 21 shown extending upwardly. At about its middle point the floating lever 21 is engaged by a rod 22 shown as extending forwardly to engage the free end of an arm 23 carried by a transverse shaft 24 rotatably mounted in bearings in the frames 10 and 11. On the shaft 24 is an operating lever 25 shown as provided with a foot pedal 26 which may be in a convenient position for ready operation by the foot of an operator seated upon the vehicle. In the rod 22 is a turn-buckle 27 for varying or adjusting the length of the rod 22. From the upper or free end of the floating lever 21 is a rod 28 shown as extending rearwardly to engage a floating lever 29 at a point preferably somewhat below its middle. From the upper or free end of the floating lever 29 is a rod 30 shown as extending rearwardly which may be adapted to operate the brake for the rear left wheel of the vehicle. At its lower end the floating lever 29 is shown pivoted to the lower end of a lever 31 which is carried at about its middle by a pivot pin 32 supported on the frame member 11. At the upper end of the lever 31 is a rod 33 shown as extending forwardly which may be adapted to operate the brake for the front left wheel of the vehicle.

Pressure on the pedal 26 will rotate the rod 24 throwing the lever 23 so as to move the floating lever 21. This will cause the rod 28 to act upon the floating lever 29 tending to move both it and its supporting lever 31. Movement will thus be caused of both the rods 30 and 33 to apply the brakes to the forward and rear wheels. The floating lever 29 associated with the lever 31 will cause a suitable equalization between the two brakes on the left side of the vehicle operated through the rod 28. The floating lever 21 associated with the lever 14 will cause some of the force supplied through the rod 22 to be distributed in the rotation of the shaft 12. The movement of the shaft will cause the rod 15 to move the floating lever 16 and the lever 18 carried thereby. Movement of these levers will move the rods 17 and 20 to operate the brakes for the wheels on the right side of the vehicle. The cooperation of the floating lever 16 with the lever 18 will tend to cause a distribution or equalization of the pressure produced by the rod 15 between the rods 17 and 20 operating the brakes on the right side of the vehicle. It will be observed that there are three points of equalization. The levers 16 and 18 tend to equalize the braking at the two ends of the right side of the vehicle, the levers 29 and 31 tend to equalize the braking at the two ends of the left side of the vehicle, and the levers 14 and 21 tend to equalize the braking on the two sides of the vehicle. The adjusting mechanism 27 operating between the sources of power illustrated as the foot pedal 26 and what may be referred to as the primary equalizing mechanism, the levers 14 and 21, provides a single point of adjustment for the entire mechanism in such a position that the adjustment when made at the point 27 will be more or less equally or appropriately distributed among the four brakes of the mechanism.

The turn-buckle and the rods may be replaced by other equilavent well known or suitable device. The proportions, relative connections and forms of elements illustrated and described form no portion of the present invention and are not essential thereto. It will be understood, therefore, that in its general aspects other suitable apparatus may be employed to embody the invention.

I claim as my invention:

1. Means for operating brakes comprising a shaft, arms rigid with the shaft, a floating lever, means extending from an arm to the floating lever for operating it, means extending from the floating lever for operating a brake, a lever pivoted near its center carrying at one end the floating lever, means extending from the other end of the pivoted lever for operating a second brake, a second floating lever carried near one end of another arm, an operating link connected near the center of the last mentioned floating lever, means extending from the free end of the last mentioned floating lever to near the center of a third floating lever, means extending from near one end of the last mentioned floating lever for operating a third brake, a lever pivoted near its center carrying at one end the last mentioned floating lever, and means extending from the other end of the last mentioned pivoted lever for operating a fourth brake.

2. A shaft, arms carried by the shaft, means extending from one arm for operating two brakes disposed on opposite sides of the axis of the shaft, equalizing means in the brake operating means, a floating lever carried by another arm, means extending from the free end of the floating lever for operating another two brakes disposed on opposite sides of the axis of the shaft, equalizing means in the last mentioned brake operating mechanism, and means connected to the floating lever for operating it and the shaft.

3. A shaft, a floating lever operated from the shaft to actuate a brake, a lever pivoted near its center and carrying the floating lever near one end and operated thereby to actuate a second brake from its other end, a second floating lever carried by the shaft and operating the shaft, a third floating lever operated from the second floating lever to actuate a third brake, and a second lever pivoted near its center carrying the third floating lever at one end and operated thereby to actuate a fourth brake from the other end.

CHAS. KONCITIK.